(12) United States Patent
Lanzone et al.

(10) Patent No.: US 8,711,889 B2
(45) Date of Patent: Apr. 29, 2014

(54) ASYNCHRONOUS LINE INTERFACE RATE ADAPTATION TO THE PHYSICAL LAYER WITH SYNCHRONOUS LINES AT THE CONNECTION LAYER

(75) Inventors: Sergio Lanzone, Genoa (IT); Orazio Toscano, Genoa (IT)

(73) Assignee: Ericsson AB, Stockholm (SE)

( * ) Notice: Subject to any disclaimer, the term of this patent is extended or adjusted under 35 U.S.C. 154(b) by 562 days.

(21) Appl. No.: 12/888,522

(22) Filed: Sep. 23, 2010

(65) Prior Publication Data

US 2011/0013651 A1  Jan. 20, 2011

Related U.S. Application Data

(62) Division of application No. 12/067,693, filed as application No. PCT/EP2006/009136 on Sep. 20, 2006, now Pat. No. 7,826,488.

(30) Foreign Application Priority Data

Sep. 21, 2005 (IT) .............................. MI2005A1749

(51) Int. Cl.
*H04J 3/02* (2006.01)

(52) U.S. Cl.
USPC ............................ 370/538; 370/537; 370/540

(58) Field of Classification Search
USPC ......... 370/314, 337, 376, 400, 401, 402, 412, 370/419, 421, 431, 437, 439, 458, 459, 462, 370/463, 464, 465, 537, 538, 540
See application file for complete search history.

(56) References Cited

U.S. PATENT DOCUMENTS

| | | | |
|---|---|---|---|
| 6,188,699 B1 * | 2/2001 | Lang et al. | 370/463 |
| 6,529,971 B1 * | 3/2003 | Thiesfeld | 710/53 |
| 2002/0029356 A1 * | 3/2002 | Takahashi | 713/600 |

FOREIGN PATENT DOCUMENTS

| | | |
|---|---|---|
| JP | 04119046 | 4/1992 |
| JP | 08125801 | 5/1996 |
| JP | 09083501 | 3/1997 |
| JP | 2001094523 A | 4/2001 |

* cited by examiner

*Primary Examiner* — Chi Pham
*Assistant Examiner* — Weibin Huang
(74) *Attorney, Agent, or Firm* — Coats & Bennett, P.L.L.C.

(57) ABSTRACT

A method for adapting the rates of a certain number of asynchronous HDLC channels (15) to a single clock domain suited for interfacing with an HDLC processor (13) through a synchronous pseudo-TDM interface (14) in which the HDLC channels are multiplexed in time and vice versa in the opposite direction. In one direction the algorithm is based on the writing of the HDLC channels in a dedicated buffer (17) and in reading these buffers with a common synchronous clock just above the expected maximum HDLC rate. The under-run condition is avoided by inserting neutral information between the end byte and the start byte of the HDLC packets when this is suggested by the buffer fill monitoring function. A simple function to locate the first and last bytes of each HDLC packet read by the buffer is hence used in combination with the buffer fill monitoring function. The algorithm is also suited in the opposite direction in which different asynchronous physical lines receive their HDLC channels from a synchronous TDM-type interface on condition that this interface clock domain be just below the minimum expected HDLC output rate. In this case also the under-run conditions are avoided by insertion of neutral data after having used the same algorithm described above. Adaptation devices and a telecommunications card using them are also proposed.

8 Claims, 1 Drawing Sheet

Figure 1:
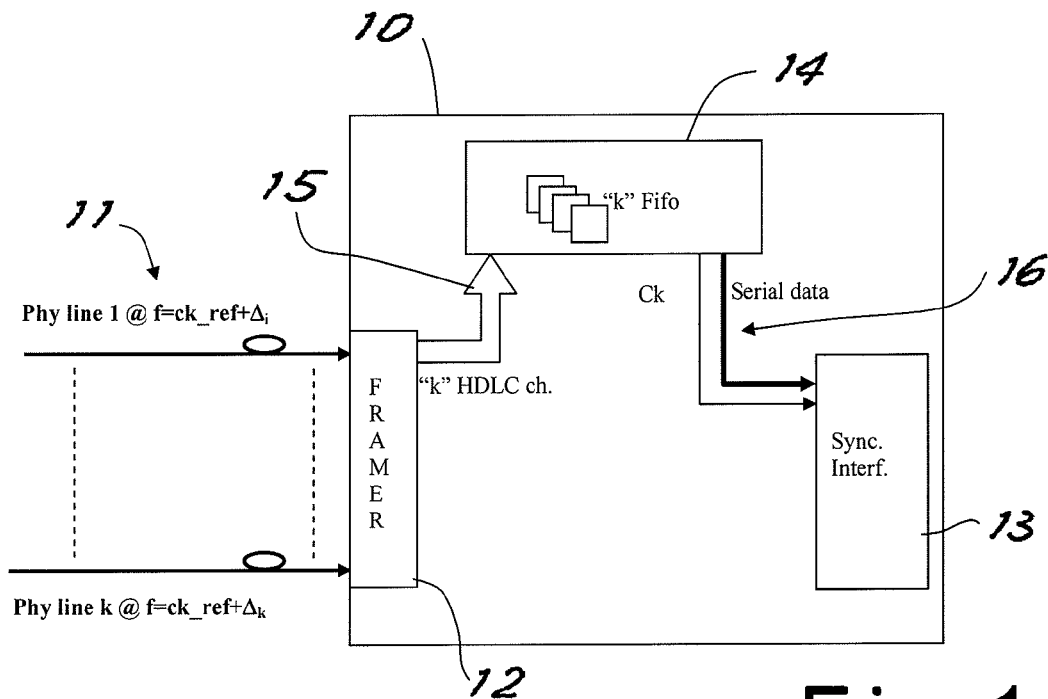

ASYNCHRONOUS LINE INTERFACE RATE ADAPTATION TO THE PHYSICAL LAYER WITH SYNCHRONOUS LINES AT THE CONNECTION LAYER

The present application is a divisional of pending U.S. application Ser. No. 12/067,693, filed in the U.S. on 21 Mar. 2008, and having a §371(c)(1), (2), (4) date of 16 Apr. 2008. The '693 application claims priority from International Application No. PCT/EP2006/009136, filed 20 Sep. 2006, and published as International Publication No. WO 2007/039107 A1, which claims priority from Italian Application No. MI2005A001749, filed 21 Sep. 2005. All of these applications are incorporated herein by reference.

This invention relates to an algorithm for the adaptation of rates of multiple signals connected at the physical layer to a communication system so as to be able to interact with a synchronous interface at the connection layer without any loss of packets. One embodiment of the invention may be viewed as an asynchronous physical layer lines to synchronous link layer interface rate adaptation bi-directional algorithm.

The equipment inserted in a synchronous data transport network receives at the physical layer a certain number of asynchronous lines, which supply the communication channels required for correct operation with remote management. For example, the Data Communication Channels (DCC) defined in standards ITU-T G.707 in the May 2002 version or the General Communication Channels (GCC) defined in standards ITU-T G.709 in the February 2001 version.

Each communication channel received by the equipment is synchronous with the physical line that carries it. For example, every Data Communication Channel (DCC) is synchronous with the Synchronous Digital Hierarchy (SDH) line as defined by standard ITU-I G.707 that carries the channel, and every General Communication Channel (GCC) line is synchronous with the Optical Transport Hierarchy (OTH) line as defined by ITU-T G.709 that carries it.

All the communications channels are connected with one or more intelligent devices contained in the equipment and able to handle the High Speed Data Link Control (HDLC) protocol contained in each of them (for example one or more microprocessors dedicated to telecommunications).

The HDLC processors should provide a certain number of HDLC interfaces at least equal to the number of asynchronous physical lines as each of these lines is characterized by its own clock signal within the specified tolerance (for example plus or minus 4.6 parts per million in the SDH case or more or less 20 parts per million in the OTH case).

Unfortunately, most telecommunications microprocessors or HDLC processors provide only a small number of HDLC asynchronous interfaces. They generally have a large number of HDLC channel processors but with a single or a small number of synchronous TDM interfaces. Each synchronous Time Division Multiplexing (TDM) interface is suitable for transmitting a large number of time slot multiplexed HDLC channels. The time slot multiplexing function of the HDLC channels is packet-loss free if all the HDLC channels belong to the same clock domain but otherwise there is a packet loss proportionate to the difference between the clock rate of the HDLC channels and the TDM-channel rate.

The higher the rate shift of the clock associated with the HDLC channel, the higher the average packet loss. Even if dedicated protocols allow retransmission of the lost packets, this event is to be avoided as it penalizes the HDLC channel transmission quality and risks overloading it. From this point of view, a rate adapting algorithm suitable for resynchronizing all the HDLC channels with a single common clock will allow use of a synchronous TDM interface with no packet loss. This way, a large number of economical HDLC processor devices will be available for communication channels processing without packet loss.

Moreover, a TDM-type interface allows more easily solving HDLC channel routing problems within telecommunications apparatuses.

The general purpose of this invention is to make available a method for resynchronizing a certain number of asynchronous HDLC channels to the same clock domain with a rate adaptation function. This rate adaptation function will allow a TDM type time slot multiplexing function including an ample number of these HDLC channels on a single interface with no loss of packets. Another purpose is to provide a method allowing the opposite adaptation also. Still another purpose is to make available devices applying said methods.

In view of said purposes it was sought to provide in accordance with this invention a method for adapting the rates of a certain number of HDLC asynchronous channels to a single clock domain suited for interfacing with an HDLC processor through a synchronous pseudo-TDM interface where the channels are multiplexed in time and in which the asynchronous HDLC channels are each written in buffers associated with each HDLC channel following the corresponding clock associated with the channel and these buffers are read with a common synchronous clock just above the expected maximum HDLC rate while inserting neutral information in the TDM channel when this is decided by a buffer fill monitoring function to avoid an under-run condition.

Again in accordance with this invention it was sought to realize an opposite method for adapting the rates between a common synchronous TDM-type interface and that comprises a certain number of synchronous HDLC channels with a common clock and a certain number of asynchronous physical lines each with its own corresponding clock and that must include their HDLC channels made from the TDM-type interface and in which are extracted the input synchronous HDLC channels and each of these is written in a buffer associated with each of the HDLC channels acting so that the interface clock will have a rate just below the expected minimum HDLC output rate and in reading these buffers with the asynchronous physical line clock associated with the physical line that must include said specific HDLC channel while inserting neutral information when this is decided by a fill monitoring function of the buffer to avoid an under-run condition.

Again in view of the purposes of this invention it was also sought to realize a device for adapting the rates of a certain number of asynchronous HDLC channels to a single clock domain suited to interfacing with an HDLC processor through a synchronous pseudo-TDM interface where the channels are multiplexed in time and characterized in that it comprises a buffer for each input channel and a buffer fill state control unit and a channel monitoring circuit and a TDM multiplexing unit and in which the asynchronous HDLC channels are written each in its dedicated buffer following the corresponding clock associated with the channel while the buffers are read with the common synchronous clock just above the expected maximum HDLC rate and sent to the TDM multiplexing unit and the buffer fill state control unit commands insertion of neutral information when that is decided by a buffer fill monitoring function to avoid an under-run condition.

There is also proposed in accordance with this invention a device for adapting the rates between a common synchronous TDM-type interface and comprising a certain number of synchronous HDLC channels with a common clock and a certain number of asynchronous physical lines each with its own corresponding clock and that must include their HDLC channels made from the TOM-type interface and characterized in that it comprises a buffer for each output channel and a buffer fill state control unit and a channel monitoring circuit and a TDM demultiplexing unit and in which the HDLC synchronous demultiplexed channels are each written in a buffer in such a manner that the interface clock has a rate just below the expected minimum output HDLC rate and the buffers are read with the asynchronous physical line clock associated with the physical line that must include said specific HDLC channel and the buffer fill state control unit commands insertion of neutral information when that is decided by its buffer fill monitoring function to avoid an under-run condition.

A telecommunications card with asynchronous-synchronous adaptation and/or vice versa in accordance with said methods and said devices is also proposed here.

To clarify the explanation of the innovative principles of this invention and its advantages compared with the prior art there is described below with the aid of the annexed drawings a possible embodiment thereof by way of non-limiting example applying said principles.

Figure 2:
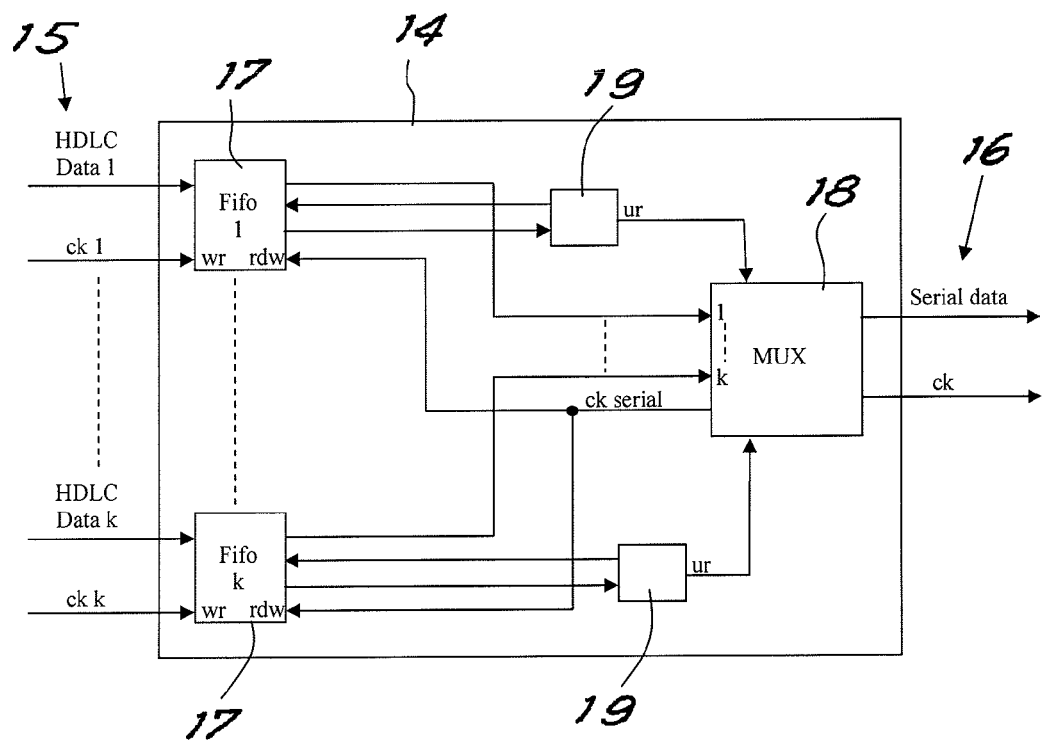

In the drawings:

FIG. 1 shows a block diagram of a telecommunications card with asynchronous-synchronous adaptation in accordance with this invention, and FIG. 2 shows a block diagram of an rate adaptation device incorporated in the card of FIG. 1.

With reference to the figures, FIG. 1 shows diagrammatically a telecommunications card designated as a whole by reference number 10 and having with multiple physical lines ('K' HDLC channels) at input. These lines are indicated generically by reference number 11.

This telecommunications card 10 includes a known frame termination device 12 suited for extracting multiple HDLC channels from the input asynchronous lines and a known HDLC processor 13 supplying its synchronous HDLC interface of the TDM type.

Each physical k line operates in accordance with its own clock which has rate f=ck_ref+Δi where Δi is a shifting which varies from line to line from the ck_ref reference clock.

The rate adaptation algorithm in accordance with this invention is realized in a device 14 that receives the k HDLC channels from the frame termination device and emits a synchronous interface serial signal 16 of the TDM type with the k channels multiplexed. This device is advantageously implemented within a Field Programmable Gate Array (FPGA) as will be readily imaginable to those skilled in the art.

The block diagram of the rate adaptation device 14 is illustrated in FIG. 2. Basically, the idea is to realize the task of adapting the rates by adding idle cells among the HDLC packets. Indeed, the rate adaptation algorithm cannot be based only or also on subtraction of idle cells because each HDLC flow can operate at the maximum speed allowed by the physical line (and even with division of the packet beginning-end among consecutive packets). Therefore, by selecting the largest serial synchronization clock signal of each shift of recommended input rate, each asynchronous HDLC channel will have to be enriched with the idle cells among the frames so as to achieve the mean synchronization rate.

To realize the device 14, a First In-First Out (FIFO) memory or buffer 17 is used for each channel extracted by the frame terminator 12. The HDLC data ("Data 1" ... "Data k") input to each FIFO memory are written therein in synchrony with the corresponding clock signal ("ck 1" ... "ck k") of the channel. Correspondingly, the data are extracted from all the FIFO memories in synchrony with a single serial clock generated by the device 14.

Monitoring units 19 detect the buffer fill state to allow application of a threshold algorithm that is advantageously used to decide when to apply the time filling necessary for the data output from the FIFO memories of the FPGA. When the reading pointer (faster) draws near the writing pointer (slower) to less than a certain threshold (measured in memory locations), the need for a time filling is decided. The dimension of the FIFO memory and the threshold are chosen so that when the time fill control signal is activated it will always be possible to stop sending the current frame before an underflow occurs.

An HDLC monitoring circuit 18 receives the FIFO output flow to find the markings of start-of-frame/end-of-frame (which are never emulated within the HDLC flow according to its definition). When a packet is terminated or is starting and a fill request signal is activated by a monitoring unit 19 because of the approach of an under-run condition, then the FIFO memory reading operations are stopped and a certain number of time fill cells are inserted until the FIFO pointer positions are above another predetermined fill threshold.

The HDLC monitoring circuit or, said in general, a layer 2 monitoring circuit, implemented within the adaptation algorithm, has no need of examining the layer 2 protocol in depth but must only find the limits of the frames (that is to say, beginning and end); every other layer 2 processing is performed through the further external layer device 2 (that is to say, the HDLC processor). This allows having a very simple and economical adaptation algorithm.

For example, in the case of layer 2 HDLC protocol in which the frame delimitation sequence is 01111110, the monitoring circuit must only take the frame delimitation rate (that is to say, 01111110) and add a sufficient number of other filling cells to reposition the FIFO pointers. This is achieved by adding time fill cells applied or at the start of a frame or at the end of a frame or between two different frames that share the start and end delimitation rate.

It is now clear that the preset purposes have been achieved. It is clear to one skilled in the art how the same above-mentioned strategy can be used in the opposite direction to convert the signals from synchronous to asynchronous by inverting the direction of the signals of data to be converted so that different asynchronous physical lines receive their HDLC channels from a TDM-type synchronous interface. In this case, the serial TDM clock signal will be slightly slower than the minimum recommended case expected to again obtain the time fill strategy described. In other words, an interface clock domain just below the expected minimum rate of HDLC output will be supplied and under-run conditions will be avoided through the insertion of neutral data after having used the same algorithm described above. The device 18 will be a demultiplexer (DEMUX). As now readily imaginable to those skilled in the art, the device 14 and the associated method of this invention for adapting the rates between the common synchronous TDM-type interface 13 and which comprises a certain number of synchronous HDLC channels to a common clock 16, and a certain number of asynchronous physical lines 15 each with its own corresponding clock and that must include their HDLC channels made from the TDM-type interface will thus comprise extraction of the input synchronous HDLC channels, write each one of these in a buffer 17 so that the interface clock has a rate just below the expected minimum output HDLC rate and read these buffers 17 with the clock of the asynchronous physical line associated with the physical line that must include said specific HDLC channel.

Similarly to before, neutral information is inserted when this is decided by a buffer fill monitoring function to avoid an under-run condition.

A telecommunications card 10 that implements one or the other or both of the conversion functions is readily imaginable to those skilled in the art on the basis of the above description.

In this document, by channels is meant, in both directions, even channel parts such as for example the data communication channels or the general communication channels or the dedicated channels.

Naturally the above description of an embodiment applying the innovative principles of this invention is given by way of non-limiting example of said principles within the scope of the exclusive right claimed here.

The invention claimed is:

1. A method for adapting the rates of a plurality of asynchronous High Speed Data Link Control (HDLC) channels to a single clock domain for time-division multiplex (TDM) interfacing with an HDLC processor, the method comprising:
    writing each asynchronous HDLC channel into a corresponding buffer according to an asynchronous clock associated with the asynchronous HDLC channel; and
    reading the buffers according to a common synchronous clock having a clock rate just above an expected maximum HDLC rate while inserting neutral information as needed to avoid an under-run condition, wherein reading the buffers forms a TDM channel of the plurality of asynchronous HDLC channels for TDM interfacing with the HDLC processor, and wherein inserting the neutral information comprises inserting the neutral information into the TDM channel.

2. The method of claim 1 further comprising extracting the asynchronous HDLC channels from corresponding input lines, wherein writing each asynchronous HDLC channel comprises writing each asynchronous HDLC channel into a corresponding dedicated memory buffer, wherein reading the buffers further comprises monitoring a buffer fill state and locating a start byte and a final byte of each HDLC packet associated with each asynchronous HDLC channel read from the buffer, and wherein inserting the neutral information comprises inserting the neutral information between the located start and final bytes each time the buffer fill state indicates that the under-run condition is near.

3. The method of claim 1 wherein the buffers comprise FIFO memory buffers.

4. The method of claim 1 wherein inserting the neutral information comprises inserting the neutral information as needed to avoid an under-run condition on any of the buffers.

5. A device for adapting the rates of a plurality of asynchronous HDLC channels to a single clock domain for time-division multiplex (TDM) interfacing with an HDLC processor, the device comprising:
    a dedicated buffer for each asynchronous HDLC channel;
    a buffer fill-state control unit for each dedicated buffer, said buffer fill-state control unit configured to receive output read from the corresponding dedicated buffer; and
    a channel monitoring circuit and a TDM multiplexing unit for receiving output from each of the buffer fill-state control units,
    wherein each asynchronous HDLC channel is each written to a corresponding dedicated buffer according to an asynchronous clock associated with the asynchronous HDLC channel, wherein each dedicated buffer is read according to a common synchronous clock having a clock rate just above an expected maximum HDLC rate to form a TDM channel sent to the TDM multiplexing unit, and wherein the buffer fill-state control unit controls insertion of neutral information into the TDM channel as needed to avoid an under-run condition.

6. The device of claim 5 wherein the monitoring circuit is configured to identify a start byte and a final byte of HDLC packets corresponding to the asynchronous HDLC channels to enable insertion of the neutral information between said start and final bytes of the HDLC packets.

7. The device of claim 5 wherein the buffer fill-state control unit controls insertion of the neutral information into the TDM channel as needed to avoid an under-run condition on any of the dedicated buffers.

8. The device of claim 5 wherein the device is part of a telecommunications card.

* * * * *

UNITED STATES PATENT AND TRADEMARK OFFICE
CERTIFICATE OF CORRECTION

PATENT NO. : 8,711,889 B2
APPLICATION NO. : 12/888522
DATED : April 29, 2014
INVENTOR(S) : Lanzone et al.

It is certified that error appears in the above-identified patent and that said Letters Patent is hereby corrected as shown below:

In the specification,

In Column 3, Line 3, delete "TOM-type" and insert -- TDM-type --, therefor.

Signed and Sealed this
Twenty-eighth Day of June, 2016

Michelle K. Lee
*Director of the United States Patent and Trademark Office*